United States Patent [19]

Sunderlin

[11] 4,094,486
[45] June 13, 1978

[54] CB RADIO MOUNTING BRACKET

[76] Inventor: Frank Sunderlin, Rte. 1, Box 120A, Pickens, S.C. 29671

[21] Appl. No.: 738,248

[22] Filed: Nov. 2, 1976

[51] Int. Cl.² .............................................. A47F 5/00
[52] U.S. Cl. ................................. 248/225.4; 248/229
[58] Field of Search .................. 248/228, 225.4, 229, 248/203

[56] References Cited

U.S. PATENT DOCUMENTS

| | | | |
|---|---|---|---|
| 1,312,399 | 8/1919 | Heywood | 248/228 X |
| 1,433,617 | 10/1922 | Hoffman | 248/228 |
| 2,707,513 | 5/1955 | Lake | 248/225.4 X |
| 2,709,563 | 5/1955 | Starkey | 248/225.4 |
| 2,739,748 | 3/1956 | Hoover | 248/225.4 X |
| 3,019,954 | 2/1962 | Faltin | 248/229 X |
| 3,370,446 | 2/1968 | Francis | 248/203 X |
| 3,476,341 | 11/1969 | Patterson | 248/229 |

Primary Examiner—James T. McCall
Assistant Examiner—Peter A. Aschenbrenner
Attorney, Agent, or Firm—Duckworth, Hobby, Allen & Pettis

[57] ABSTRACT

A mounting bracket for use in a motor vehicle for securing a CB radio or the like to the dashboard by means of a housing member having mounting means and locking means operatively associated therewith to provide the necessary clamping force against the dashboard, and readily released to remove CB radio.

9 Claims, 3 Drawing Figures

CB RADIO MOUNTING BRACKET

BACKGROUND OF THE INVENTION

The present invention relates to a mounting bracket, particularly suitable for use in motor vehicles for mounting a CB radio or the like from the dashboard.

With the tremendous growth of CB radio, I have found the need to provide a mounting bracket that is almost universal in nature, such that a CB radio may be readily connected to a motor vehicle dashboard.

OBJECTS OF THE INVENTION

An object of the present invention is to provide a mounting bracket for a CB radio or the like for use on a motor vehicle dashboard.

Another object of the present invention is to provide a mounting bracket that is readily secured to and released from a dashboard without the need of drilling holes therethrough.

Another object of the present invention is to provide a mounting bracket that is readily and inexpensively manufactured.

Other objects and advantages of the present invention will become apparent as the disclosure proceeds.

SUMMARY OF THE INVENTION

A mounting bracket for use in a motor vehicle for securing a CB radio or the like to the upper and lower sides of a dashboard. The mounting bracket includes a housing member having a base adapted to be secured to the CB or the like, with a wall extending upwardly from the base, with an upper rail extending outwardly from the wall in substantially overlapping relationship to the base, and a lower rail extending outwardly from the wall intermediate and in substantially overlapping relationship to the upper rail and the base and terminating in a front end. The dashboard adapted to extend within the channel formed between the rails and beyond the front end.

Mounting means operatively associated with the rails in the channel to provide the necessary suspension of the mounting bracket relative to the dashboard is provided. The mounting means includes a pair of spaced apart protrusions extending upwardly from the lower rail into the channel and proximate the wall for engagement with the lower side of the dashboard, and a pair of spaced apart prongs extending downwardly from the upper rail into the channel and forward of the protrusions. The prongs are adapted to engage the upper side of the dashboard so as to engage same.

Locking means operatively associated with the lower ral is provided and includes a pair of levers each individually manually operable between a locking position in which the forward end thereof engages the lower side of the dashboard so as to cause the dashboard to be clamped in locked position between each prong providing a downward clamping force and each protrusion and lever providing an upward clamping force, to a release position in which each lever is disengaged from contacting engagement with the dashboard.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
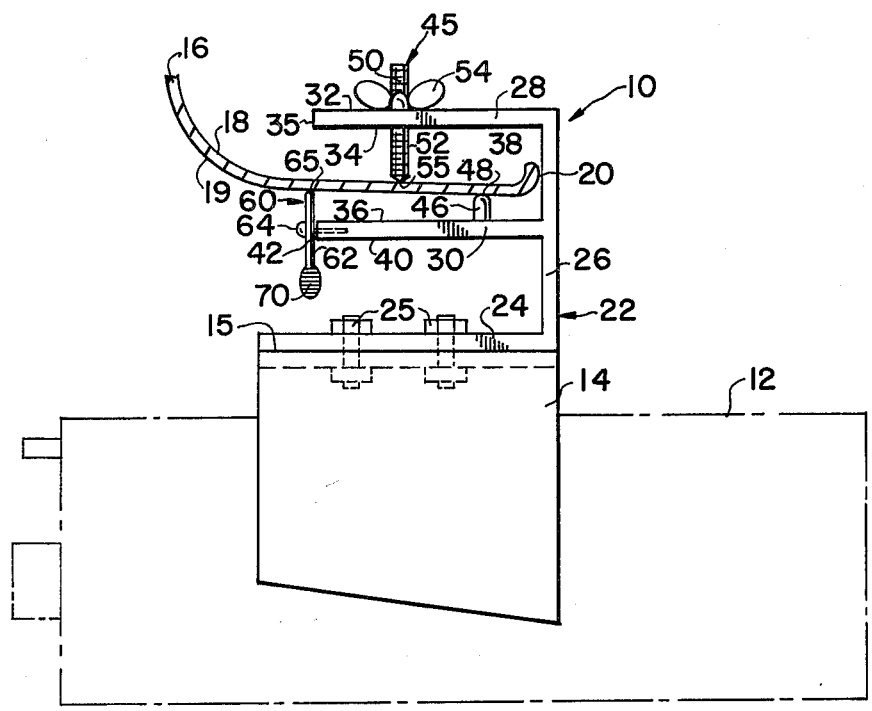
FIG. 1 is a side view illustrating the mounting bracket of the present invention.
Figure 2:
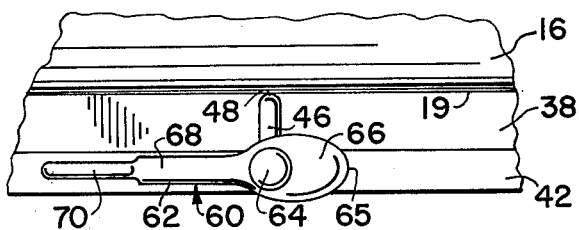
FIG. 2 is a fragmentary front view illustrating the locking means in the open position.
Figure 3:
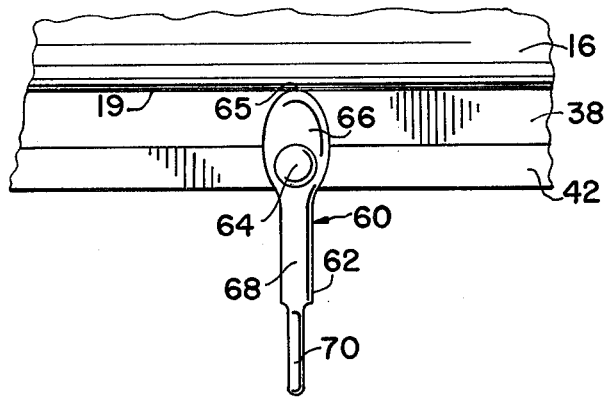
FIG. 3 is a fragmentary front view illustrating the locking means in the closed position.

Referring to the drawings, there is illustrated in FIGS. 1–3 a bracket 10 for use in a motor vehicle for securing a CB radio or the like 12 having a standard mounting unit 14 associated therewith. The standard mounting unit 14 has an upper surface 15 adapted to be secured to the mounting bracket 10 of the present invention.

The CB unit 12 is to be hung from below the dashboard 16 which has an upper side 18 and lower side 19 and terminating in a forward end 20. The bracket 10 includes a housing member 22 which has a base 24 adapted to be secured to the upper surface 15 of the mounting unit 14 as by fasteners 25 in a conventional manner. A vertically extending wall 26 may be integrally formed with the base 24. Associated with the wall 26 is an upper rail 28 that extends outwardly from the wall 26 in substantially overlapping relationship to the base 24. A lower rail 30 extends outwardly from the wall 26 intermediate and in substantially overlapping relationship to the upper rail 28 and the base 24.

The upper wall 28 has an outer surface 32, an inner surface 34, and a forward edge 35. The lower rail 30 has an upper surface 36 in spaced relationship to the lower surface 34 to define a channel 38 therebetween. The lower rail 30 further includes a bottom surface 40 and a front end 42. As seen in FIG. 1, the dashboard 16 extends within the channel 38 and between the rails 28 and 30 and extending beyond the front end 42.

Mounting means 45 are provided to releasably retain the dashboard 16 in the channel 38 to provide the necessary suspension of the mounting bracket 10 relative to the dashboard 16. The mounting means 45 includes a pair of spaced apart protrusions or projections 46 in spaced relationship to each other (only one being shown). The protrusions each include a forward end or tip 48 for engagement with the lower side 19 of the dashboard 16.

The protrusions 46 extend proximate to the wall 26 and may be integrally formed with the lower rail 30. A pair of spaced apart prongs 50 extend downwardly from the upper rail 28 and within the channel 38 and forward of the protrusions 46. A pair of prongs 50 are utilized, although one is illustrated, to provide maximum stability. Each prong 50 may have threads 52 thereon and be in threaded engagement with the upper rail 28. A wing nut 54 is provided thereon to adjust the extension of the distal end 55 of the prong 50 within the channel 38. Accordingly, the prongs 50 are vertically adjustable within the channel to accommodate dashboards of different contour, thickness, etc.

Locking means 60 is provided to readily permit locking engagement between the bracket 10 and dashboard 16. The locking means 60 may be operatively associated with the lower rail 30 and include a pair of levers or arms 62, as illustrated in FIGS. 2 and 3, although one is shown. Each lever 62 is adapted for rotation by means of a transversely extending pin 64 which enters the lower rail 30. Each lever 62 is individually manually operable between a locking position in which the forward end 65 engages the lower side 19 of the dashboard 16 so as to cause the dashboard 16 to be clamped in locked position, as illustrated in FIGS. 1 and 3. In the locked position the prongs 50 provide a downward clamping force, and each protrusion 46 and lever 48 provide an upward clamping force.

The release position of the locking means 60 is illustrated in FIG. 2, and the lever 62 is disengaged from contacting engagement with the dashboard 16. Each lever 62 is elongated and mounted for angular rotation by pin 64. The lever 62 has a rounded bulbous forward end 65 terminating in the head portion 66 with a handle 68 extending outwardly therefrom. The handle 68 includes an enlarged gripping section 70 extending in a plane substantially normal to the rotational plane of the lever 62. In this way the user may easily grasp the gripping section 70 to lock or release the bracket 10 in place. In the locked or closed position the forward edge 65 is above the tip 48. In addition, each respective pair of protrusion 46, prong 50, and lever 62, may be in substantial alignment with each other.

In this way, the mounting bracket 10 may be readily adjusted to fit various dashboards and without drilling of any holes the mounting bracket 10 of the present invention may be readily utilized. The mounting bracket is preferably made from metal or heavy duty plastic.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A mounting bracket for use in a motor vehicle for securing a CB or the like to the upper and lower sides of a dashboard, said mounting bracket comprising:
   a. a housing member including:
      (1) a base adapted to be secure to the CB or the like,
      (2) a wall extending upwardly from said base,
      (3) An upper rail extending outwardly from said wall in substantially overlapping relationship to said base, and
      (4) a lower rail extending outwardly from said wall intermediate and in substantially overlapping relationship to said upper rail and said base and terminating in a front end, the dashboard adapted to extend within the channel formed between said rails and beyond said front end,
   b. mounting means operatively associated with said rails in said channel to provide the necessary suspension of the mounting bracket relative to the dashboard, said mounting means including:
      (1) a pair of spaced apart protrusion extending upwardly from said lower rail into said channel and proximate said wall for engagement with the lower side of the dashboard, and
      (2) a pair of spaced apart adjustable prongs extending downwardly from said upper rail into said channel and outwardly of said protrusions, said prongs adapted to engage the upperside of the dashboard so as to engage same, each said prong having a threaded stud extending in threaded engagement through said upper rail and a wing nut thereon to adjust the extension of said prong within said channel,
   c. locking means mounted outwardly of said prongs on said lower rail and including a pair of levers pivotally mounted intermediate their ends to said lower rail so that in a locking position a forward end of each lever extends above said lower rail and a rear end of said lever extends below said lower rail, each of said levers being individually manually operable between a locking position in which the forward end thereof engages the lower side of the dashboard to be clamped in locked position between each said prong providing a downward clamping force and each said protrusion and lever providing an upward clamping force, to a release position in which each said lever is disengaged from contacting engagement with the dashboard.

2. A mounting bracket as in claim 1, wherein said prongs are adjustable vertically relative to said channel.

3. A mounting bracket as in claim 1, wherein said levers are elongated and mounted for angular rotation relative to said front end of said lower rail.

4. A mounting bracket as in claim 3, wherein each lever includes:
   a. a rounded forward edge for ready engagement and release from the dashboard,
   b. a handle at the rear of said lever.

5. A mounting bracket as in claim 4, wherein said handle includes an enlarged gripping section extending in a plane substantially normal to the rotational plane of said lever.

6. A mounting bracket as in claim 4, wherein each said lever is coupled by a pin to said front end.

7. A mounting bracket as in claim 4, wherein said forward edge is bulbous in configuration.

8. A mounting bracket as in claim 4, wherein said forward edge of said lever in the closed position thereof is above said protrusion.

9. A mounting bracket as in claim 1, wherein each pair of said protrusion, prong and lever are substantially in alignment with each other.

* * * * *